United States Patent
Jones et al.

(10) Patent No.: US 11,661,038 B2
(45) Date of Patent: May 30, 2023

(54) WORK MACHINES INCORPORATING CAMERA CLEANING SYSTEMS AND METHODS OF OPERATING SAME

(71) Applicant: DEERE & COMPANY, Moline, IL (US)

(72) Inventors: Amy K. Jones, Dubuque, IA (US); Zimin W. Vilar, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 494 days.

(21) Appl. No.: 16/841,906

(22) Filed: Apr. 7, 2020

(65) Prior Publication Data

US 2021/0309188 A1    Oct. 7, 2021

(51) Int. Cl.
*B60S 1/56*    (2006.01)
*E02F 9/26*    (2006.01)

(52) U.S. Cl.
CPC ............. *B60S 1/566* (2013.01); *E02F 9/265* (2013.01)

(58) Field of Classification Search
CPC ................................. E02F 9/265; B60S 1/566
See application file for complete search history.

(56) References Cited

U.S. PATENT DOCUMENTS

| | | |
|---|---|---|
| 2012/0117745 A1 | 5/2012 | Hattori et al. |
| 2015/0032292 A1 | 1/2015 | Stratton |
| 2018/0009418 A1 | 1/2018 | Newman |
| 2018/0290632 A1 | 10/2018 | Rice et al. |
| 2019/0301144 A1* | 10/2019 | Kean ................. E02F 9/265 |
| 2021/0114561 A1* | 4/2021 | Kong ................. B60S 1/44 |
| 2021/0301493 A1* | 9/2021 | Abd El Salam Mohamed ........... E02F 3/437 |

FOREIGN PATENT DOCUMENTS

| | | |
|---|---|---|
| CN | 107953862 A | 4/2018 |
| DE | 102018118846 A1 | 2/2019 |
| DE | 102018125796 A1 | 4/2019 |
| DE | 102019125303 A1 | 3/2020 |
| DE | 102019125484 A1 | 3/2020 |

OTHER PUBLICATIONS

German Search Report issued in application No. DE102021201942.0 dated Jan. 20, 2022 (09 pages).

* cited by examiner

*Primary Examiner* — Michael D Jennings
(74) *Attorney, Agent, or Firm* — Taft Stettinius & Hollister LLP; Stephen F. Rost

(57) ABSTRACT

Work machines, control systems for work machines, and methods of operating work machines are disclosed herein. A work machine includes a frame structure, a work implement, a camera, a cleaning system, and a control system. The work implement is coupled to the frame structure and includes at least one ground engagement tool configured for interaction with an underlying surface in use of the work machine. The camera is coupled to the frame structure and configured to provide camera input indicative of one or more images captured by the camera in use of the work machine. The cleaning system is coupled to the frame structure and configured to clean the camera in use of the work machine. The control system is coupled to the frame structure and includes a controller communicatively coupled to the camera and the cleaning system.

8 Claims, 7 Drawing Sheets

WORK MACHINES INCORPORATING CAMERA CLEANING SYSTEMS AND METHODS OF OPERATING SAME

FIELD OF THE DISCLOSURE

The present disclosure relates, generally, to control systems for work machines such as construction machines, and, more specifically, to control systems for work machines incorporating one or more cameras.

BACKGROUND

Construction machines often include ground engagement tools configured to penetrate the ground in use thereof. Such machines may also include one or more cameras configured to capture images in use thereof. The performance of cameras may be impacted by operation of ground engagement tools. Accordingly, devices and/or systems to improve camera performance during operation of ground engagement tools remain an area of interest.

SUMMARY

The present disclosure may comprise one or more of the following features and combinations thereof.

According to one aspect of the present disclosure, a work machine may include a frame structure, a work implement, a camera, a cleaning system, and a control system. The work implement may be coupled to the frame structure, and the work implement may include at least one ground engagement tool configured for interaction with an underlying surface in use of the work machine. The camera may be coupled to the frame structure and configured to provide camera input indicative of one or more images captured by the camera in use of the work machine. The cleaning system may be coupled to the frame structure and configured to clean the camera in use of the work machine. The control system may be coupled to the frame structure, and the control system may include a controller communicatively coupled to the camera and to the cleaning system. The controller may include memory having instructions stored therein that are executable by a processor to cause the processor to receive the camera input from the camera and to clean the camera by the cleaning system based at least partially on the camera input.

In some embodiments, the work machine may include an operator cab coupled to the frame structure that defines an interior compartment sized to accommodate an operator in use of the work machine and a main wiper device coupled to the operator cab that is configured to clean an exterior surface of the operator cab in use of the work machine, the control system may include a main wiper sensor that is communicatively coupled to the controller and configured to provide wiper input indicative of an operational state of the main wiper device, and the instructions stored in the memory may be executable by the processor to cause the processor to receive the wiper input from the main wiper sensor, to determine whether the main wiper device is activated based on the wiper input, and to clean the camera by the cleaning system at least partially in response to a determination that the main wiper device is activated. The control system may include a work implement sensor that is communicatively coupled to the controller and configured to provide work implement input indicative of an operational state of the ground engagement tool in use of the work machine, and the instructions stored in the memory may be executable by the processor to cause the processor to receive the work implement input from the work implement sensor, to determine whether a runtime duration of the ground engagement tool is greater than a reference duration based on the work implement input, and to clean the camera by the cleaning system at least partially in response to a determination that the runtime duration of the ground engagement tool is greater than the reference duration.

In some embodiments, the instructions stored in the memory may be executable by the processor to cause the processor to measure the brightness of the one or more images associated with the camera input, to determine whether the brightness of the one or more images is less than a reference brightness based on the camera input, and to clean the camera by the cleaning system at least partially in response to a determination that the brightness of the one or more images is less than the reference brightness. The instructions stored in the memory may be executable by the processor to cause the processor to determine based on the camera input whether the camera is inactive and/or whether the one or more images are not displayed by a dashboard of the control system, and to clean the camera by the cleaning system at least partially in response to a determination that the camera is inactive and/or that the one or more images are not displayed by the dashboard. The work machine may be an excavator and the ground engagement tool may be a hydraulic hammer configured to break up the underlying surface in use of the work machine.

In some embodiments, the camera input may include shutter input provided by a shutter sensor of the camera that is indicative of actuation of a shutter of the camera in use of the work machine, and the instructions stored in the memory may be executable by the processor to cause the processor to determine an operational state of the camera based on the shutter input and to clean the camera by the cleaning system at least partially in response to a determination that the shutter is actuated. The work machine may be an excavator and the ground engagement tool may be a hydraulic hammer configured to break up the underlying surface in use of the work machine.

According to another aspect of the present disclosure, a control system mounted on a work machine including a frame structure, a work implement coupled to the frame structure having at least one ground engagement tool configured for interaction with an underlying surface, a camera coupled to the frame structure that is configured to provide camera input indicative of one or more images captured by the camera, and a cleaning system coupled to the frame structure that is configured to clean the camera may include a controller. The controller may be communicatively coupled to the camera and to the cleaning system. The controller may include memory having instructions stored therein that are executable by a processor to cause the processor to receive the camera input from the camera and to clean the camera by the cleaning system based at least partially on the camera input.

In some embodiments, the work machine may include an operator cab coupled to the frame structure that defines an interior compartment sized to accommodate an operator and a main wiper device coupled to the operator cab that is configured to clean an exterior surface of the operator cab, the control system may include a main wiper sensor that is communicatively coupled to the controller and configured to provide wiper input indicative of an operational state of the main wiper device, and the instructions stored in the memory may be executable by the processor to cause the processor to receive the wiper input from the main wiper sensor, to determine whether the main wiper device is activated based on the wiper input, and to clean the camera by the cleaning system at least partially in response to a determination that the main wiper device is activated. The control system may include a work implement sensor that is communicatively coupled to the controller and configured to provide work implement input indicative of an operational state of the ground engagement tool. The instructions stored in the memory may be executable by the processor to cause the processor to receive the work implement input from the work implement sensor, to determine whether a runtime duration of the ground engagement tool is greater than a reference duration based on the work implement input, and to clean the camera by the cleaning system at least partially in response to a determination that the runtime duration of the ground engagement tool is greater than the reference duration.

In some embodiments, the instructions stored in the memory may be executable by the processor to cause the processor to measure the brightness of the one or more images associated with the camera input, to determine whether the brightness of the one or more images is less than a reference brightness based on the camera input, and to clean the camera by the cleaning system at least partially in response to a determination that the brightness of the one or more images is less than the reference brightness. The instructions stored in the memory may be executable by the processor to cause the processor to determine based on the camera input whether the camera is inactive and/or whether the one or more images are not displayed by a dashboard of the control system, and to clean the camera by the cleaning system at least partially in response to a determination that the camera is inactive and/or that the one or more images are not displayed by the dashboard. The work machine may be an excavator and the ground engagement tool may be a hydraulic hammer configured to break up the underlying surface. Additionally, in some embodiments, the camera input may include shutter input provided by a shutter sensor of the camera that is indicative of actuation of a shutter of the camera, and the instructions stored in the memory may be executable by the processor to cause the processor to determine an operational state of the camera based on the shutter input and to clean the camera by the cleaning system at least partially in response to a determination that the shutter is actuated.

According to yet another aspect of the present disclosure, a method of operating a work machine including a frame structure, a work implement coupled to the frame structure having at least one ground engagement tool configured for interaction with an underlying surface, a camera coupled to the frame structure that is configured to provide camera input indicative of one or more images captured by the camera, and a cleaning system coupled to the frame structure that is configured to clean the camera may include receiving, by a controller of the work machine, the camera input from the camera, and cleaning, by the cleaning system, the camera based at least partially on the camera input.

In some embodiments, the work machine may include an operator cab coupled to the frame structure that defines an interior compartment sized to accommodate an operator, a main wiper device coupled to the operator cab that is configured to clean an exterior surface of the operator cab, and a main wiper sensor that is communicatively coupled to the controller and configured to provide wiper input indicative of an operational state of the main wiper device, and the method may include receiving, by the controller, the wiper input from the main wiper sensor, determining, by the controller, whether the main wiper device is activated based on the wiper input, and cleaning, by the cleaning system, the camera at least partially in response to a determination by the controller that the main wiper device is activated. The method may include receiving, by the controller, work implement input indicative of an operational state of the ground engagement tool from a work implement sensor that is communicatively coupled to the controller, determining, by the controller, whether a runtime duration of the ground engagement tool is greater than a reference duration based on the work implement input, and cleaning, by the cleaning system, the camera at least partially in response to a determination by the controller that the runtime duration of the ground engagement tool is greater than the reference duration.

In some embodiments, the method may include measuring, by the controller, the brightness of the one or more images associated with the camera input, determining, by the controller, whether the brightness of the one or more images is less than a reference brightness based on the camera input, and cleaning, by the cleaning system, the camera at least partially in response to a determination by the controller that the brightness of the one or more images is less than the reference brightness. The method may include determining, by the controller, whether the camera is inactive and/or whether the one or more images are not displayed by a dashboard of the control system based on the camera input, and cleaning, by the cleaning system, the camera at least partially in response to a determination by the controller that the camera is inactive and/or that the one or more images are not displayed by the dashboard.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
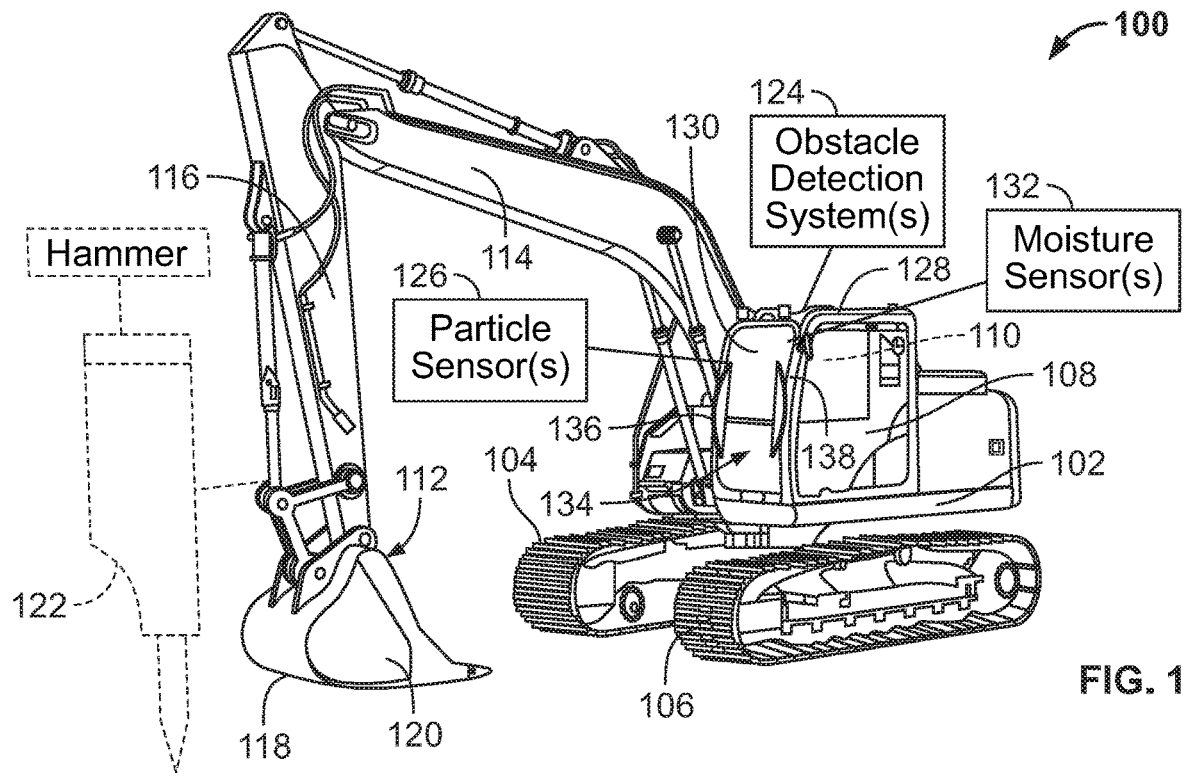
FIG. 1 is a front perspective view of a work machine having a work implement configured for interaction with an underlying surface.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an illustrative work machine 100 includes a frame structure 102 that is supported for movement relative to an underlying surface (i.e., the ground) on a pair of tracks 104, 106. An operator cab 108 of the work machine 100 is coupled to the frame structure 102 and defines an interior compartment 110 (shown in phantom) that is sized to accommodate an operator in use of the work machine 100. A number of operator controls and/or input devices (not shown) are disposed in the interior compartment 110 and accessible by the operator to control operation of the work machine 100 through a control system 600 (see FIG. 6) thereof.

The illustrative work machine 100 includes at least one work implement 112 that is coupled to the frame structure 102 through a boom 114 and a hydraulic support arm assembly 116. The at least one work implement 112 has a ground engagement tool 118 that is configured for interaction with the underlying surface in use of the machine 100. In the illustrative embodiment, the ground engagement tool 118 is embodied as, or otherwise include, a bucket 120 adapted to carry a portion of the underlying surface (e.g., soil, concrete, rock, etc.) in use thereof. In other embodiments, however, the ground engagement tool 118 may be embodied as, or otherwise include, another suitable device. In one example, the ground engagement tool 118 may be embodied as, or otherwise include, a hydraulic hammer 122 (shown in phantom) adapted to break up and/or pulverize the underlying surface in use thereof.

In the illustrative embodiment, the work machine 100 is embodied as, or otherwise includes, an excavator adapted for use in one or more construction applications. Of course, it should be appreciated that in other embodiments, the work machine 100 may be embodied as, or otherwise include, other equipment adapted for use in other suitable applications. For example, in some embodiments, the work machine 100 may be embodied as, included in, or otherwise adapted for use with, equipment used in lawn and garden, tillage, landscaping and ground care, golf and sports turf, forestry, engine and drivetrain, or government and military applications. In such embodiments, the work machine 100 of the present disclosure may be included in, or otherwise adapted for use with, tractors, front end loaders, scraper systems, cutters and shredders, hay and forage equipment, planting equipment, seeding equipment, tillage equipment, sprayers and applicators, utility vehicles, mowers, dump trucks, backhoes, track loaders, crawler loaders, dozers, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative work machine 100 includes at least one camera (e.g., one or more of cameras 210, 214 shown in FIG. 2 and/or one or more of cameras 310, 410, 510 shown in respective FIGS. 3-5) and/or vision systems coupled to the frame structure 102. The at least one camera is configured to provide camera input indicative of one or more images captured by the at least one camera in use of the work machine 100. Additionally, the illustrative work machine 100 includes at least one cleaning system (e.g., one or more of the cleaning systems 320, 420, 520 shown in respective FIGS. 3-5) coupled to the frame structure 102. Each cleaning system is configured to one of the camera(s) in use of the work machine 100 as further explained below.

In the illustrative embodiment, the work machine 100 includes the control system 600 coupled to the frame structure 102. As described in greater detail below with reference to FIG. 6, the control system 600 includes a controller 602 that is communicatively coupled to the one or more cameras and to the one or more cleaning systems. The controller 602 includes memory 604 and a processor 606. The memory 604 has instructions stored therein that are executable by the processor 606 to cause the processor 606 to receive the camera input from the camera and to clean the camera by the cleaning system based at least partially on the camera input.

It should be appreciated that in use of the work implement 112, particulates, dust, foreign matter, debris, moisture, or the like may accumulate on the one or more cameras of the work machine 100. Such accumulation(s) may impact the overall performance of the one or more cameras. In some cases, the accumulation(s) may obscure the quality of the images captured by the one or more cameras and thereby reduce the performance thereof. As will be apparent from the teachings of the present disclosure, the control system 600 may direct cleaning of the one or more cameras using the cleaning systems to maintain quality of the images in use of the work machine 100.

The illustrative work machine 100 includes one or more obstacle detection systems 124 configured to detect obstacles that may be encountered by the work machine 100 in use thereof. Each obstacle detection system 124 may be mounted at a particular location (e.g., to the operator cab 108 or to the boom 114) and arranged to detect obstacles (e.g., rocks, washouts, stationary objects, moving objects, people, etc.) in a particular area. In one example, one obstacle detection system 124 may be arranged to detect obstacles in front of the work machine 100, and another obstacle detection system 124 may be arranged to detect obstacles behind the work machine 100. In any case, each obstacle detection system 124 may be embodied as, or otherwise include, a camera detection system 624 (see FIG. 6) that includes the camera(s) (e.g., one or more of cameras 210, 214 shown in FIG. 2 and/or one or more of cameras 310, 410, 510 shown in respective FIGS. 3-5) discussed above. As such, each obstacle detection system 124 may be configured to detect obstacles based on the one or more images captured by the camera(s) in use of the work machine 100.

To detect particle buildup in use of the work machine 100, in some embodiments, the work machine 100 may include one or more particle sensors 126. The one or more particle sensors 126 may be mounted at any suitable location of the work machine 100. In one example, the particle sensor(s) 126 may be mounted to a roof 128 of the operator cab 108. In another example, the particle sensor(s) 126 may be mounted to a windshield 130 of the operator cab 108. In yet another example, the particle sensor(s) 126 may be mounted to the boom 114. Furthermore, it should be appreciated that each of the particle sensor(s) 126 may be mounted directly to a camera (e.g., to a housing of the camera) to detect particle buildup on the camera in use of the work machine 100.

To detect moisture accumulation in use of the work machine 100, in some embodiments, the work machine 100 may include one or more moisture sensors 132. The one or more moisture sensors 132 may be mounted at any suitable location of the work machine 100. In one example, the moisture sensor(s) 132 may be mounted to the roof 128 of the operator cab 108. In another example, the moisture sensor(s) 132 may be mounted to the windshield 130 of the operator cab 108. In yet another example, the moisture sensor(s) 132 may be mounted to the boom 114. Furthermore, it should be appreciated that each of the moisture sensor(s) 132 may be mounted directly to a camera (e.g., to a housing of the camera) to detect moisture accumulation on the camera in use of the work machine 100.

In the illustrative embodiment, the work machine 100 includes a wiper assembly 134 coupled to the operator cab 108 that is configured to clean an exterior surface (e.g., the windshield 130) thereof. The illustrative wiper assembly 134 includes main wiper devices 136, 138. Each of the illustrative main wiper devices 136, 138 is embodied as, or otherwise includes, a wiper blade, squeegee, or the like. Of course, it should be appreciated that in other embodiments, each of the main wiper devices 136, 138 may be embodied as, or otherwise include, another suitable device.

Figure 2:
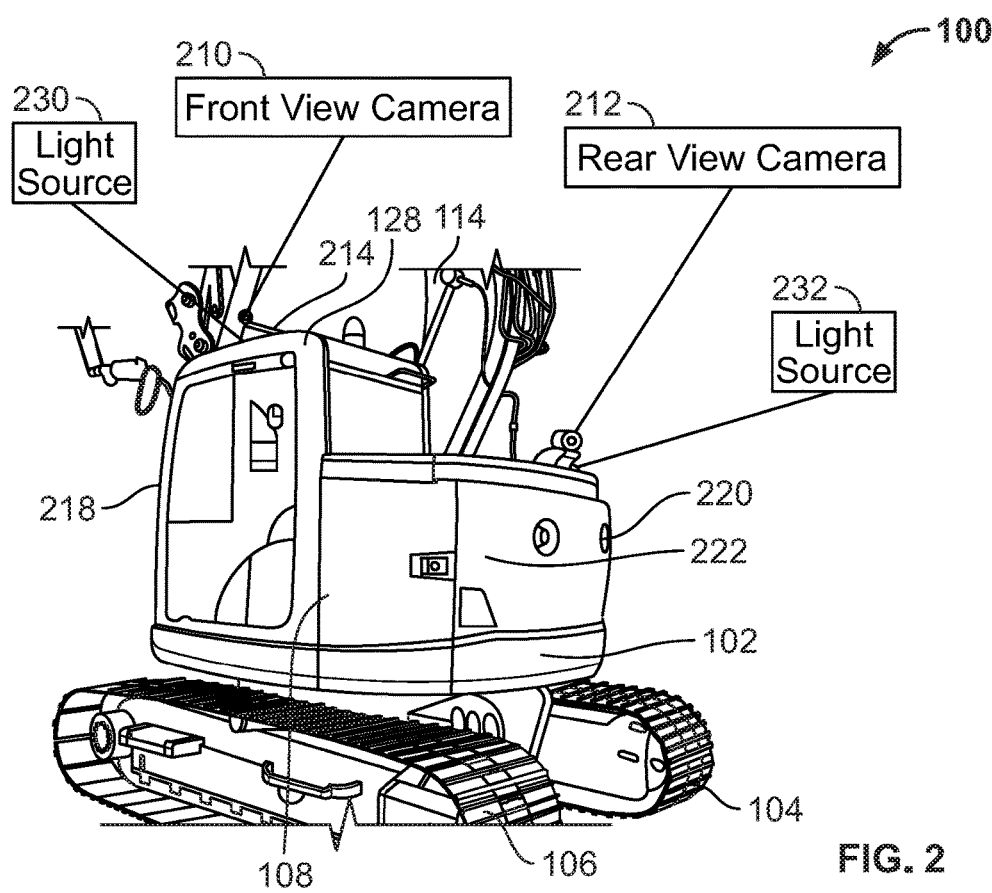
FIG. 2 is a rear perspective view of the work machine of FIG. 1.

Referring now to FIG. 2, in some embodiments, the camera(s) of the work machine 100 may include the cameras and/or vision systems 210, 212. In the illustrative arrangement, the camera 210 is coupled to the roof 128 of the operator cab 108 by a support arm 214 such that the camera 210 is capable of capturing images of a front side 218 of the cab 108 and/or obstacles located in close proximity to the front side 218. As such, at least in the illustrative arrangement, the camera 210 may be referred to as a front view camera. Additionally, in the illustrative arrangement, the camera 212 is coupled to a back side 220 of a housing 222 coupled to the frame structure 102 such that the camera 212 is capable of capturing images of the back side 220 and/or obstacles located in close proximity to the back side 220. As such, at least in the illustrative arrangement, the camera 212 may be referred to as a rear view camera. Of course, it should be appreciated that the cameras 212, 214 may be mounted in other suitable locations to capture other suitable views.

A light source 230 is illustratively arranged in close proximity to the camera 210 to provide illumination that may facilitate image capture by the camera 210 and/or identification of objects in the images, at least in some embodiments. Additionally, a light source 232 is illustratively arranged in close proximity to the camera 212 to provide illumination that may facilitate image capture by the camera 212 and/or identification of objects in the images. It should be appreciated that the light sources 230, 232 may be arranged in other suitable locations to facilitate image capture by the corresponding cameras 210, 212, and that such arrangement may depend on, and/or be dictated by, the arrangement of the corresponding cameras 210, 212. In some embodiments, however, it should be appreciated that the light sources 230, 232 may be omitted entirely.

Figure 3:
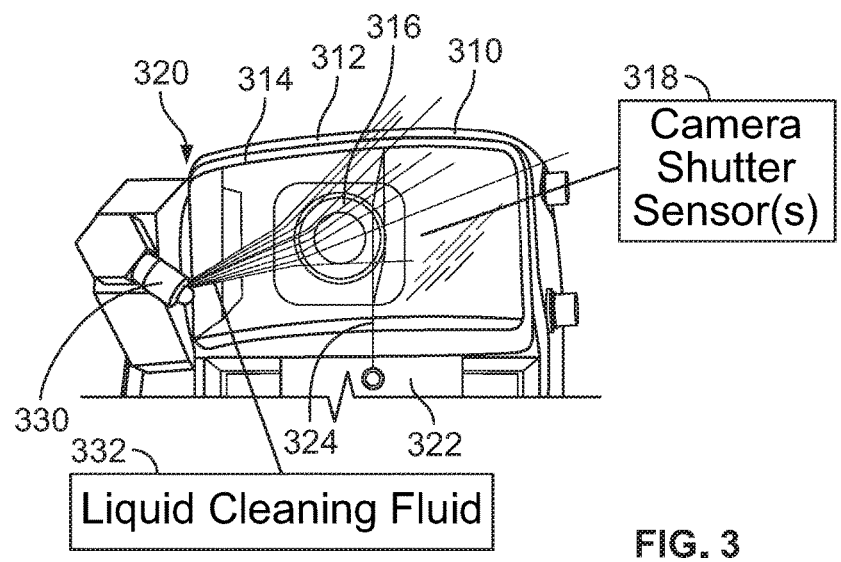
FIG. 3 is a front perspective view of a camera and a cleaning system adapted for incorporation into the work machine of FIG. 1.
Figure 4:
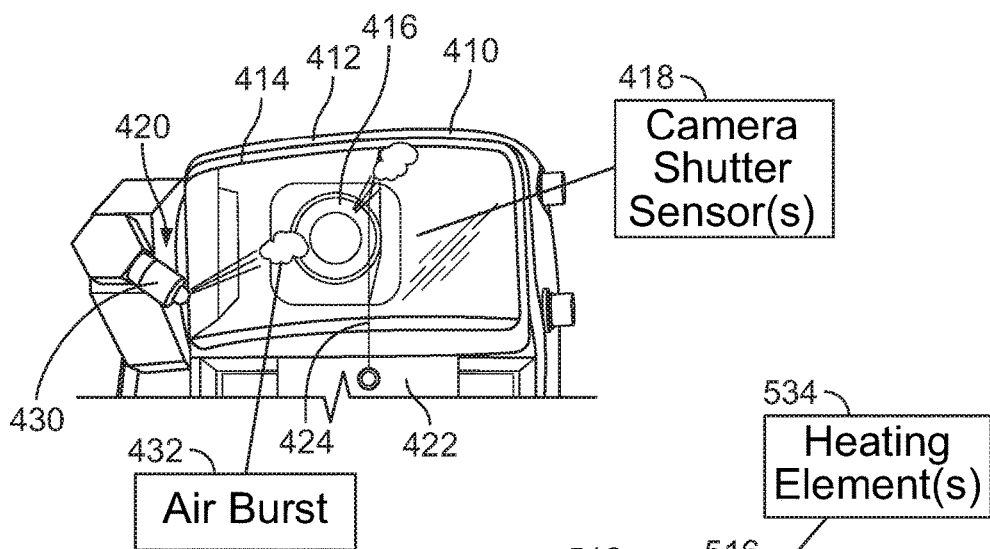
FIG. 4 is a front perspective view of a camera and another cleaning system adapted for incorporation into the work machine of FIG. 1.
Figure 5:
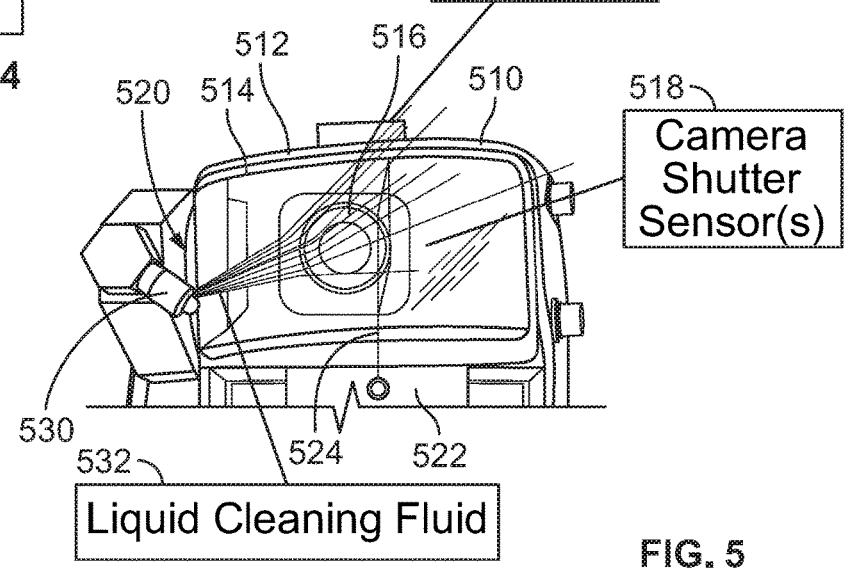
FIG. 5 is a front perspective view of a camera and yet another cleaning system adapted for incorporation into the work machine of FIG. 1.

Referring now to FIGS. 3-5, cleaning systems 320, 420, 520 are adapted for use with respective cameras 310, 410, 510 to clean the cameras 310, 410, 510 in use thereof. Each of the illustrative cleaning systems 320, 420, 520 is adapted for inclusion in the work machine 100. Accordingly, each of the cameras 310, 410, 510 is adapted for such inclusion. The cameras 310, 410, 510 are substantially identical to one another and in at least some embodiments, the cameras 310, 410, 510 are substantially identical to each of the cameras 210, 212.

Each of the cameras and/or vision systems 310, 410, 510 is illustratively embodied as, or otherwise includes, any device or collection of devices capable of capturing images in the form of camera input and providing the input to other component(s). Each of the cameras 310, 410, 510 illustratively includes at least one feature that may require cleaning by the respective cleaning system 320, 420, 520 in use of the work machine 100. In some embodiments, the cameras 310, 410, 510 may include, as respective components, housings 312, 412, 512 and protective screens 314, 414, 514 retained by the housings 312, 412, 512 that cover lenses 316, 416, 516 of the cameras 310, 410, 510. In such embodiments, the screens 314, 414, 514 may require cleaning by the respective cleaning systems 320, 420, 520. Of course, in other embodiments, it should be appreciated that the screens 314, 414, 514 may be entirely omitted, and that in such embodiments, the lenses 316, 416, 516 may require cleaning.

Each of the illustrative cameras 310, 410, 510 includes a shutter (not shown) and at least one respective shutter sensor 318, 418, 518. The shutter of each camera 310, 410, 510 is configured to be actuated (e.g., opened or closed) to selectively permit light passage therethrough. Each of the shutter sensors 318, 418, 518 is configured to detect actuation of the shutter of the corresponding camera 310, 410, 510 in use of the work machine 100.

Each of the illustrative cleaning systems 320, 420, 520 includes, as respective components, a mount block 322, 422, 522 and a secondary wiper device 324, 424, 524 coupled to the mount block 322, 422, 522 for movement relative thereto. In the illustrative embodiment, the wiper devices 324, 424, 524 are pivotally coupled to the corresponding mount blocks 322, 422, 522. Of course, it should be appreciated that in other embodiments, the wiper devices 324, 424, 524 may be coupled to the corresponding mount blocks 322, 422, 522 for rotation and translation relative thereto. In any case, each of the wiper devices 324, 424, 524 is illustratively embodied as, or otherwise includes, a wiper blade, squeegee, or the like.

Referring now to FIG. 3, the illustrative cleaning system 320 includes a nozzle dispenser 330 that is arranged to deliver cleaning fluid to the screen 314 and/or the lens 316 in use of the working machine 100. In the illustrative embodiment, the nozzle dispenser 330 is configured to deliver liquid cleaning fluid 332 to the screen 314 and/or the lens 316 to clean the screen 314 and/or the lens 316. Of course, in other embodiments, the nozzle dispenser 330 may be configured to deliver another suitable fluid to the screen 314 and/or the lens 316 to clean those components. Regardless, cleaning fluid delivered to the screen 314 and/or the lens 316 by the nozzle dispenser 330 may be wiped away using the wiper device 324.

Referring now to FIG. 4, the illustrative cleaning system 420 includes a nozzle dispenser 430 that is arranged to deliver cleaning fluid to the screen 414 and/or the lens 416 in use of the working machine 100. In the illustrative embodiment, the nozzle dispenser 430 is configured to deliver an air burst 432 to the screen 414 and/or the lens 416 to clean the screen 414 and/or the lens 416. Of course, in other embodiments, the nozzle dispenser 430 may be configured to deliver another suitable fluid to the screen 414 and/or the lens 416 to clean those components. Regardless, cleaning fluid delivered to the screen 414 and/or the lens 416 by the nozzle dispenser 430 may be wiped away using the wiper device 424.

Referring now to FIG. 5, the illustrative cleaning system 520 includes a nozzle dispenser 530 that is arranged to deliver cleaning fluid to the screen 514 and/or the lens 516 in use of the working machine 100. In the illustrative embodiment, the nozzle dispenser 530 is configured to deliver liquid cleaning fluid 532 to the screen 514 and/or the lens 516 to clean the screen 514 and/or the lens 516. Of course, in other embodiments, the nozzle dispenser 530 may be configured to deliver another suitable fluid to the screen 514 and/or the lens 516 to clean those components. Regardless, cleaning fluid delivered to the screen 514 and/or the lens 516 by the nozzle dispenser 530 may be wiped away using the wiper device 524. Additionally, the cleaning system 520 includes one or more heating elements 534 that are arranged in close proximity to the screen 514 and/or the lens 516. Each heating element 534 is configured to deliver heat to the screen 514 and/or the lens 516 to dry the camera 510 in use of the work machine 100. Of course, it should be appreciated that in some embodiments, the heating element(s) 534 may be entirely omitted.

Figure 6:
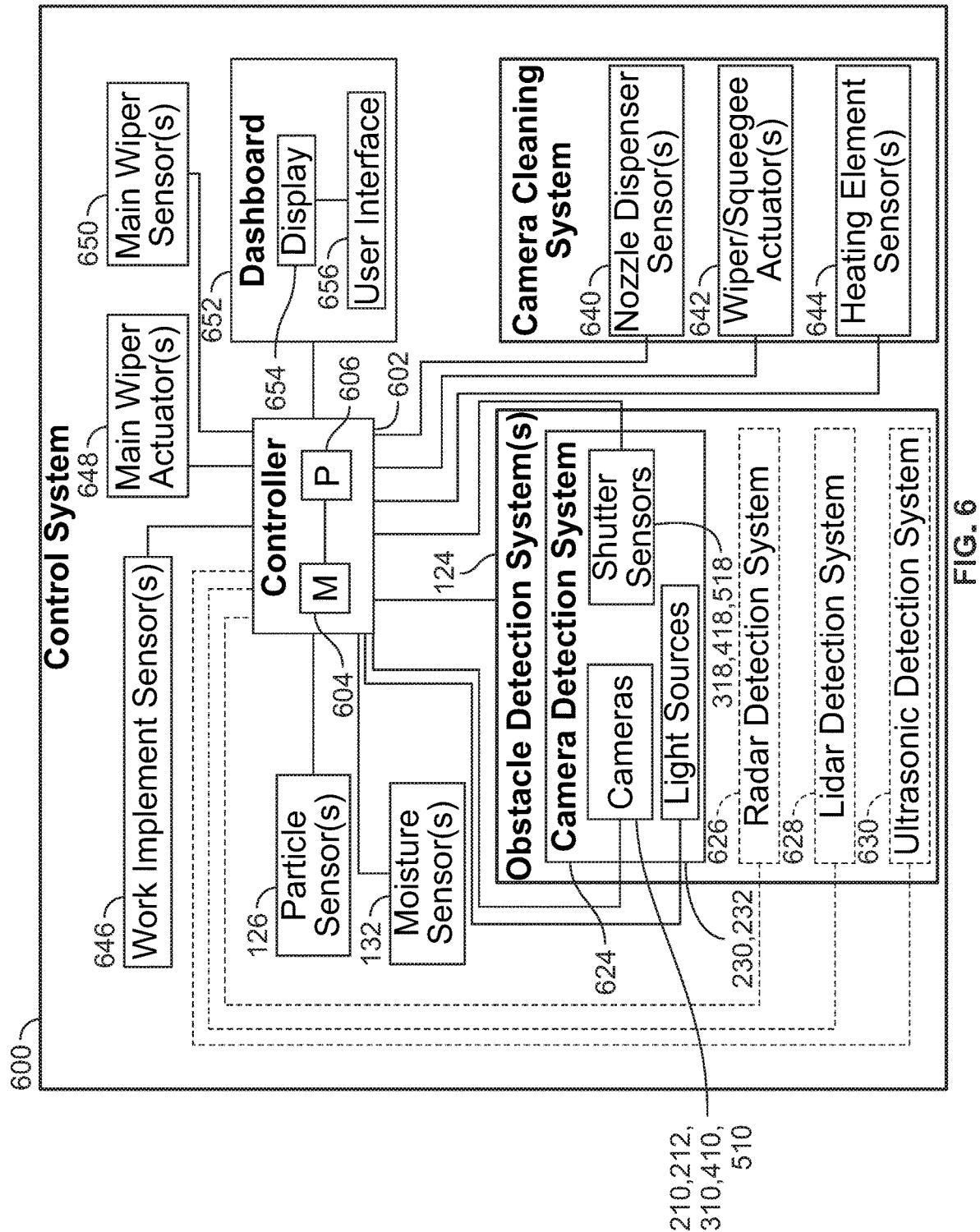
FIG. 6 is a diagrammatic view of a control system included in the work machine of FIG. 1.

Referring now to FIG. 6, in the illustrative embodiment, the control system 600 includes the one or more obstacle detection systems 124, the one or more particle sensor(s) 126, the one or more moisture sensor(s) 132, one or more nozzle dispenser sensor(s) 640, one or more secondary wiper actuator(s) 642, one or more heating element sensor(s) 644, one or more work implement sensor(s) 646, one or more main wiper actuator(s) 648, one or more main wiper sensor(s) 650, and a dashboard 652. Each of the devices and/or systems 124, 126, 132, 640, 642, 644, 646, 648, 650, 652 is communicatively coupled to the controller 602. As indicated above, the controller 602 includes memory 604 and the processor 606 coupled to the memory 604.

The memory device 604 of the illustrative controller 602 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at wwwjedec.org). Such standards (and similar standards) may be referred to as DDR-based standards and communication interfaces of the storage devices that implement such standards may be referred to as DDR-based interfaces.

In some embodiments, the memory device 604 may be embodied as a block addressable memory, such as those based on NAND or NOR technologies. The memory device 604 may also include future generation nonvolatile devices, such as a three dimensional crosspoint memory device (e.g., Intel 3D XPoint™ memory), or other byte addressable write-in-place nonvolatile memory devices. In some embodiments, the memory device 604 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The processor 606 of the illustrative controller 602 may be embodied as, or otherwise include, any type of processor, controller, or other compute circuit capable of performing various tasks such as compute functions and/or controlling the functions of the work machine 100. For example, the processor 606 may be embodied as a single or multi-core processor(s), a microcontroller, or other processor or processing/controlling circuit. In some embodiments, the processor 606 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 606 may be embodied as, or otherwise include, a high-power processor, an accelerator co-processor, or a storage controller. In some embodiments still, the processor 606 may include more than one processor, controller, or compute circuit.

The one or more illustrative obstacle detection systems 124 include the camera detection system 624 as indicated above. The camera detection system 624 includes one or more of the cameras 210, 212, 310, 410, 510, each of which is coupled to the controller 602. Additionally, the camera detection system 624 includes the light sources 230, 232 coupled to the controller 602 and the shutter sensors 318, 418, 518 coupled to the controller 602. It should be appreciated that the light sources and the shutter sensors may be provided in correspondence to the number of cameras such that one light source and one shutter sensor may be provided for each camera. As such, more than two light sources 230, 232 and more than three shutter sensors 318, 418, 518 may be provided based on the cameras 210, 212, 310, 410, 510.

In some embodiments, the one or more obstacle detection systems 124 may include a radar detection system 626 (shown in phantom). The illustrative radar detection system 626 may be embodied as, or otherwise include, any device or collection of devices capable of detecting and/or imaging, based on radio waves, obstacles that may be encountered by the work machine 100 in use thereof. The illustrative system 626 may include a number of components (not shown), such as one or more transmitters, one or more antennas, and one or more signal processors communicatively coupled to the controller 602. Each transmitter may be embodied as, or otherwise include, any device or collection of devices capable of emitting radio waves or radar signals in predetermined directions toward obstacles located proximate the work machine 100. Each antenna may be embodied as, or otherwise include, any device or collection of devices capable of receiving radar signals emitted by the transmitter(s) that are reflected and/or scattered by the obstacles. Each signal processor may be embodied as, or otherwise include, any device or collection of devices (e.g., one or more processor(s)) capable of amplifying, processing, and/or conditioning radar signals received by the antenna(s) to recover useful radar signals. Of course, it should be appreciated that in some embodiments, the radar detection system 626 may be omitted entirely.

In some embodiments, the one or more obstacle detection systems 124 may include a lidar detection system 628 (shown in phantom). The illustrative lidar detection system 628 may be embodied as, or otherwise include, any device or collection of devices capable of detecting and/or imaging, using ultraviolet, visible, or near infrared light, obstacles that may be encountered by the work machine 100 in use thereof. The illustrative detection system 628 may include a number of components (not shown), such as one or more lasers and one or more image capture devices communicatively coupled to the controller 602. Each laser may be embodied as, or otherwise include, any device or collection of devices capable of emitting ultraviolet, visible, or near infrared light toward obstacles located proximate the work machine 100. Each image capture device may be embodied as, or otherwise include, any device or collection of devices capable of illuminating a viewable area proximate the work machine 100, sensing light reflected by any obstacles thereto, and processing the signals reflected by the obstacles to develop three-dimensional representations of the obstacles. In some embodiments, each image capture device may be embodied as, or otherwise include, a flash lidar camera that has a light source, a sensor, and a controller. Furthermore, it should be appreciated that in some embodiments, the detection system 628 may include other suitable components in addition to, or as an alternative to, the aforementioned devices, such as one or more phased array(s), microelectromechanical device(s), scanner(s), and photodetector(s), for example. Additionally, it should be appreciated that in some embodiments, the lidar detection system 628 may be omitted entirely.

In some embodiments, the one or more obstacle detection systems 124 may include an ultrasonic detection system 630 (shown in phantom). The illustrative ultrasonic detection system 630 may be embodied as, or otherwise include, any device or collection of devices capable of detecting and/or imaging, based on ultrasonic sound waves, obstacles that may be encountered by the work machine 100 in use thereof. The illustrative detection system 630 may include a number of components (not shown), such as one or more signal generators and one or more receivers communicatively coupled to the controller 602. Each signal generator may be embodied as, or otherwise include, any device or collection of devices capable of generating and emitting ultrasonic sound waves toward obstacles located proximate the work machine 100. Each receiver may be embodied as, or otherwise include, any device or collection of devices capable of receiving sound waves provided thereto from the obstacles and converting the sound waves into measurable electrical signals. It should be appreciated that in some embodiments, the detection system 630 may include other suitable components in addition to, or as an alternative to, the aforementioned devices, such as one or more signal processor(s), for example. Additionally, it should be appreciated that in some embodiments, the ultrasonic detection system 630 may be omitted entirely.

The illustrative particle sensor(s) 126 are each embodied as, or otherwise include, any device or collection of devices capable of detecting and/or counting physical particles (e.g., by optical imaging) in use of the work machine 100. Each of the particle sensor(s) 126 may be embodied as, or otherwise include, a solid particle counter, a liquid particle counter, an aerosol particle counter, or the like, for example. Of course, in other embodiments, each of the particle sensor(s) 126 may be embodied as, or otherwise include, another suitable device.

The illustrative moisture sensor(s) 132 are each embodied as, or otherwise include, any device or collection of devices capable of detecting moisture and/or humidity present in the surrounding environment in use of the work machine 100. Each of the moisture sensor(s) 132 may be embodied as, or otherwise include, a hygrometer, a moisture meter, a humidity sensor, or the like, for example. Of course, in other embodiments, each of the moisture sensor(s) 132 may be embodied as, or otherwise include, another suitable device.

The illustrative nozzle dispenser sensor(s) 640 are each embodied as, or otherwise include, any device or collection of devices capable of detecting the presence or absence of cleaning fluid (e.g., air, liquid, etc.) delivered to one of the cameras (e.g., one of the cameras 210, 212, 310, 410, 510) by one of the nozzle dispensers (e.g., one of the nozzle dispensers 330, 430, 530) in use of the work machine 100. It should be appreciated that the number of sensor(s) 640 may be provided in correspondence to the number of cameras such that one sensor 640 may be provided for each camera.

The illustrative secondary wiper actuator(s) 642 are each embodied as, or otherwise include, any device or collection of devices capable of driving movement or actuation of one of the secondary wiper devices 324, 424, 524 in use of the work machine 100. It should be appreciated that the number of actuator(s) 642 may be provided in correspondence to the number of cameras such that one actuator 642 may be provided for each camera.

The illustrative heating element sensor(s) 644 are each embodied as, or otherwise include, any device or collection of devices capable of detecting activation (or lack thereof) of one of the heating element(s) 534. It should be appreciated that the number of sensor(s) 644 may be provided in correspondence to the number of cameras such that one sensor 644 may be provided for each camera.

The illustrative work implement sensor(s) 646 are each embodied as, or otherwise include, any device or collection of devices capable of detecting an operational characteristic of the work implement 112 in use of the work machine 100. In one example, each work implement sensor(s) 646 may be configured to detect an operational characteristic (e.g., position, velocity, acceleration, activation or de-activation thereof, etc.) of the bucket 120 in use of the work machine 100. In another example, each work implement sensor(s) 646 may be configured to detect an operational characteristic (e.g., position, velocity, acceleration, activation or de-activation thereof, etc.) of the hydraulic hammer 122 in use of the work machine 100.

The illustrative main wiper actuator(s) 648 are each embodied as, or otherwise include, any device or collection of devices capable of driving movement or actuation of one of the main wiper devices 136, 138. It should be appreciated that the number of actuator(s) 648 may be provided in correspondence to the number of main wiper devices 136, 138. As such, in the illustrative embodiment, two actuators 648 are provided to drive corresponding actuation of the two main wiper devices 136, 138.

The illustrative main wiper sensor(s) 650 are each embodied as, or otherwise include, any device or collection of devices capable of detecting activation (or lack thereof) of one of the main wiper devices 136, 138. It should be appreciated that the number of sensor(s) 650 may be provided in correspondence to the number of main wiper devices 136, 138. Accordingly, in the illustrative embodiment, two sensors 650 are provided to detect corresponding operation of the two main wiper devices 136, 138.

The illustrative dashboard 652 includes a display 654 and a user interface 656 communicatively coupled thereto. The display 654 is configured to output or display various indications, messages, and/or prompts to an operator, which may be generated by the control system 600. The user interface 656 is configured to provide various inputs to the control system 600 based on various actions, which may include actions performed by an operator.

Figure 7:
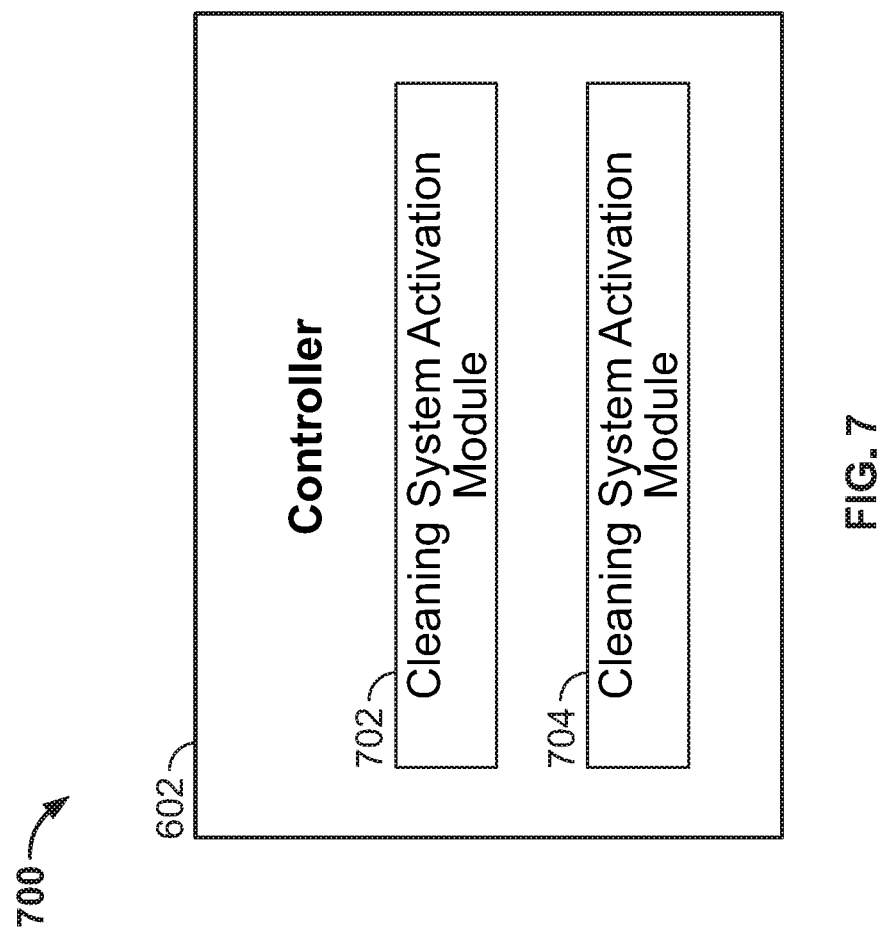
FIG. 7 is a diagrammatic view of a number of modules that may be included in a controller of the control system shown in FIG. 6.

Referring now to FIG. 7, in the illustrative embodiment, the controller 602 establishes an environment 700 during operation. The illustrative environment 700 includes a cleaning system activation module 702 and a cleaning system activation module 704. Each of the modules, logic, and other components of the environment 700 may be embodied as hardware, firmware, software, or a combination thereof. As such, in some embodiments, one or more modules of the environment 700 may be embodied as circuitry or a collection of electrical devices. In such embodiments, one or more of the cleaning system activation modules 702, 704 may form a portion of the processor(s) 606 and/or other components of the controller 602. Additionally, in some embodiments, one or more of the illustrative modules may form a portion of another module and/or one or more of the illustrative modules may be independent of one another. Further, in some embodiments, one or more of the modules of the environment 700 may be embodied as virtualized hardware components or emulated architecture, which may be established and maintained by the processor(s) 606 or other components of the controller 602.

Figure 8:
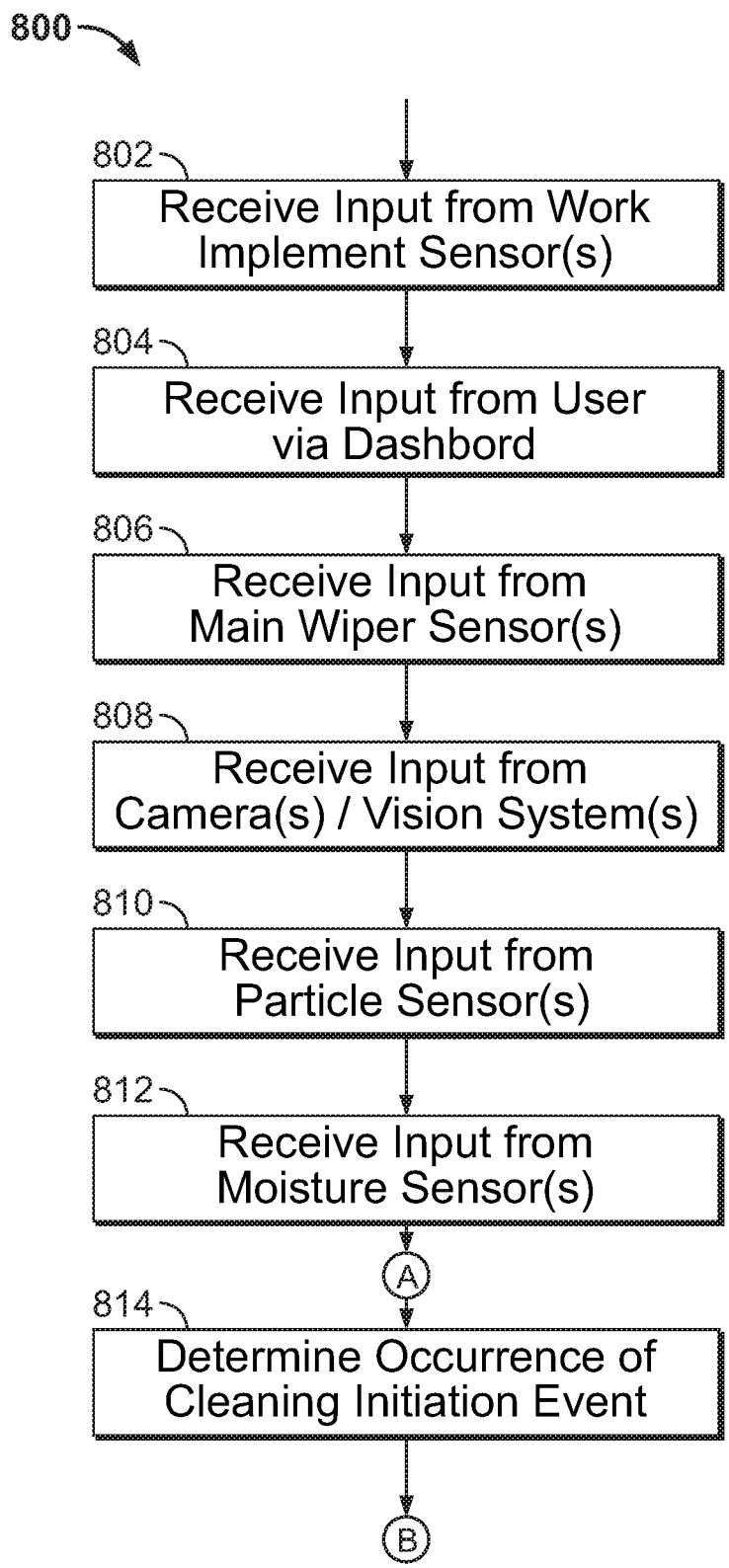
FIG. 8 is a simplified flowchart of a portion of a method that may be performed by a first cleaning system activation module of the controller diagrammatically depicted in FIG. 7.
Figure 9:
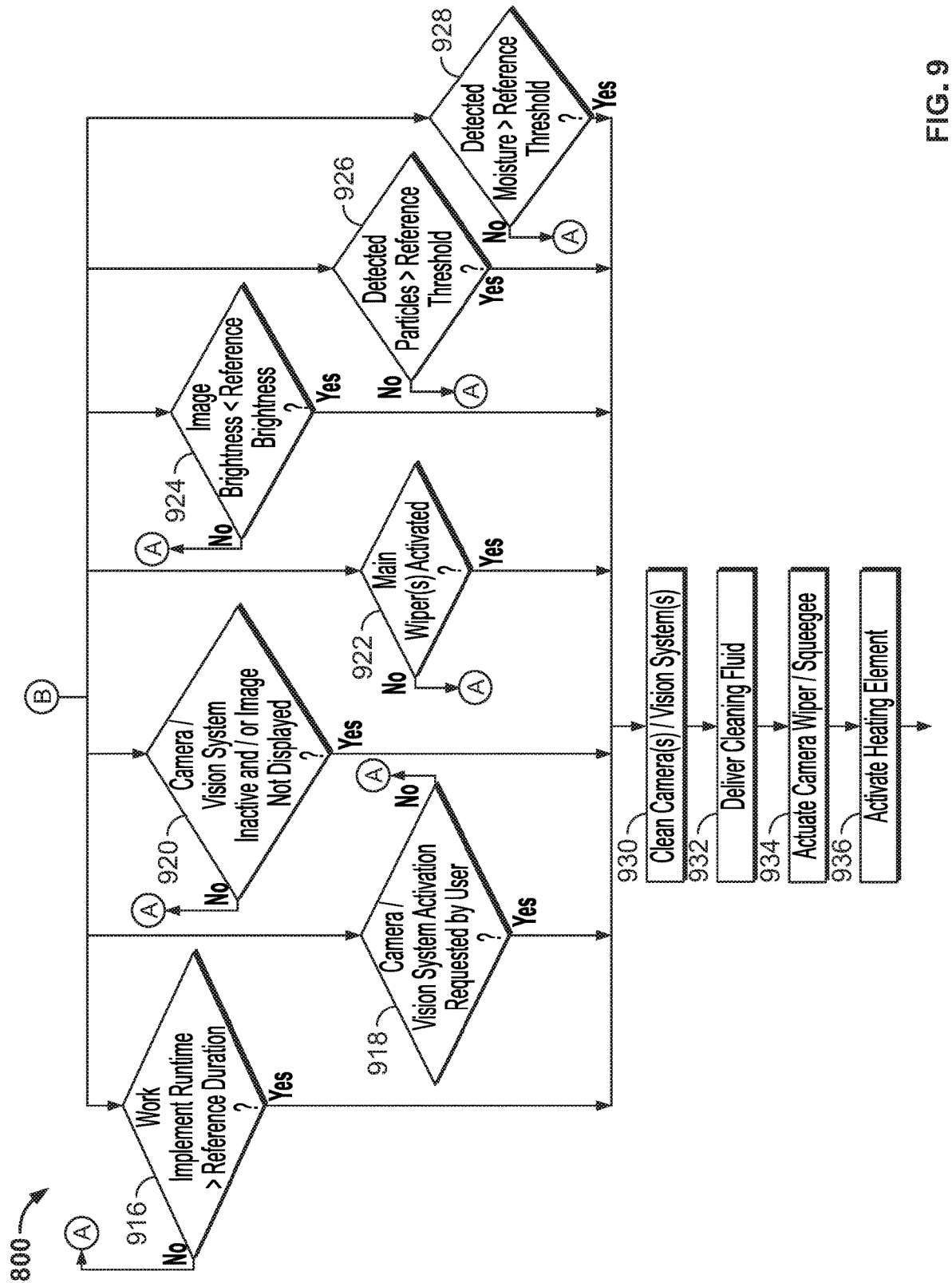
FIG. 9 is a simplified flowchart of another portion of the method of FIG. 8.

The cleaning system activation module 702, which may be embodied as hardware, firmware, software, virtualized hardware, emulated architecture, and/or a combination thereof as discussed above, is configured to direct cleaning of one or more cameras (e.g., one or more of the cameras 210, 212, 310, 410, 510) using the one or more cleaning systems (e.g., one or more of the cleaning systems 320, 420, 520) in response to one or more initiating events, which are described in greater detail below with reference to FIGS. 8 and 9. To do so, in the illustrative embodiment, the cleaning system activation module 702 may perform the method described below with respect to FIGS. 8 and 9.

Figure 10:
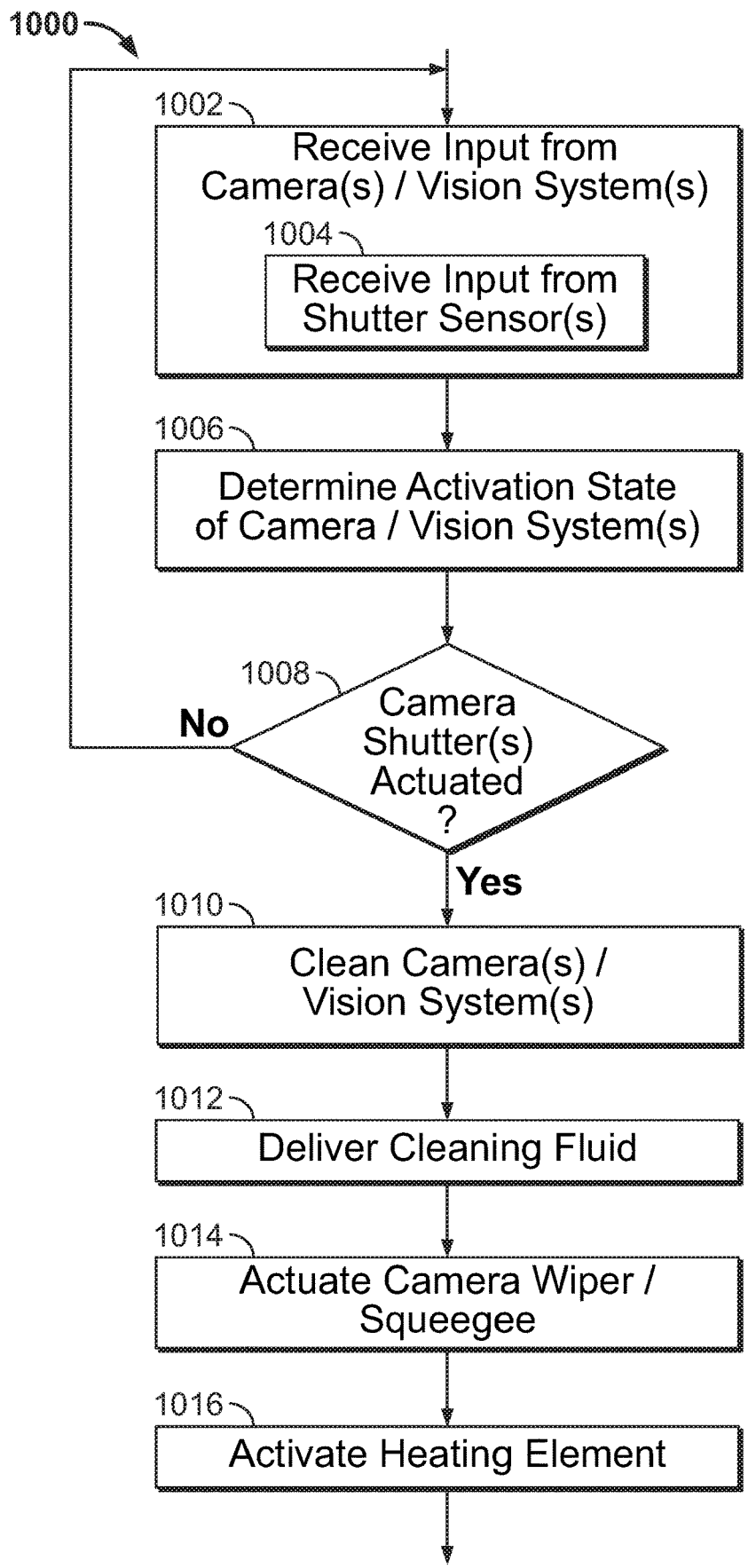
FIG. 10 is a simplified flowchart of a method that may be performed by a second cleaning system activation module of the controller diagrammatically depicted in FIG. 7.

The cleaning system activation module 704, which may be embodied as hardware, firmware, software, virtualized hardware, emulated architecture, and/or a combination thereof as discussed above, is configured to direct cleaning of one of more cameras (e.g., one or more of the cameras 210, 212, 310, 410, 510) using the one or more cleaning systems (e.g., one or more of the cleaning systems 320, 420, 520) in response to actuation of the shutter(s) of the camera(s) as described in greater detail below with reference to FIG. 10. To do so, in the illustrative embodiment, the cleaning system activation module 704 may perform the method described below with respect to FIG. 10.

Referring now to FIGS. 8 and 9, an illustrative method 800 of operating the work machine 100 may be embodied as, or otherwise include, a set of instructions that are executable by the control system 600 (i.e., the cleaning system activation module 702 of the controller 602). The method 800 corresponds to, or is otherwise associated with, performance of the blocks described below in the illustrative sequence of FIGS. 8 and 9. It should be appreciated, however, that the method 800 may be performed in one or more sequences different from the illustrative sequence.

The illustrative method 800 begins with block 802. In block 802, the controller 602 receives input from the one or more work implement sensors 646 indicative of an operational characteristic and/or operational mode of the work implement 112. As indicated above, the input provided by the sensor(s) 646 may be indicative of an operational characteristic and/or operational mode of the bucket 120 or the hammer 122, depending on the particular configuration of the work machine 100. From block 802, the method 800 subsequently proceeds to block 804.

In block 804 of the illustrative method 800, the controller 602 receives input (or a lack thereof) from the dashboard 652 (i.e., the user interface 656) that is indicative of a command or directive provided by a user. In some embodiments, the input received by the controller 602 in block 804 may prompt activation of one or more components of the work machine 100, such as one or more of the cameras 210, 212, 310, 410, 510, one or more of the cleaning systems 320, 420, 520, and/or the main wiper devices 136, 138, for example. In any case, following block 804, the method 800 proceeds to block 806.

In block 806 of the illustrative method 800, the controller 602 receives input from the one or more main wiper sensors 650 indicative of an operational state (e.g., an activation state) of the main wiper devices 136, 138. Subsequent to block 806, the method 800 proceeds to block 808.

In block 808 of the illustrative method 800, the controller 602 receives input from the camera(s) 210, 212, 310, 410, 510 indicative of one or more images captured by the camera(s) 210, 212, 310, 410, 510. From block 808, the method 800 subsequently proceeds to block 810.

In block 810 of the illustrative method 800, the controller 602 receives input from the one or more particle sensor(s) 126 indicative of an amount of particles in the surrounding environment of the work machine 100. Following block 810, the method 800 proceeds to block 812.

In block 812 of the illustrative method 800, the controller 602 receives input from the one or more moisture sensor(s) 132 indicative of an amount of moisture and/or humidity in the surrounding environment of the work machine 100. Subsequent to block 812, the method 800 proceeds to block 814.

In block 814 of the illustrative method 800, the controller 602 determines the occurrence (or lack thereof) of an event that initiates cleaning of one or more of the cameras 210, 212, 310, 410, 510 using one or more of the cleaning systems 320, 420, 520. For ease of illustration, reference to the letter "A" in FIGS. 8 and 9 specifies the performance of, and/or the return to, block 814 of the illustrative method 800. From block 814, the method 800 subsequently proceeds to one or more blocks 916, 918, 920, 922, 924, 926, 928 as indicated by the letter "B" in FIGS. 8 and 9. It should be appreciated that following performance of block 814, the controller 602 may perform the blocks 916, 918, 920, 922, 924, 926, 928 substantially in parallel with one another, at least in some embodiments. Additionally, at least in some embodiments, it should be appreciated that the controller 602 may perform the blocks 916, 918, 920, 922, 924, 926, 928 substantially contemporaneously with one another.

In block 916 of the illustrative method 800, based on the input provided by the work implement sensor(s) 646 in block 802, the controller 602 determines whether a runtime duration of the ground engagement tool 118 (e.g., the bucket 120 or the hammer 122) is greater than a reference duration. In some embodiments, the reference duration may be a time period during which particles and/or moisture may accumulate in the surrounding environment of the work machine 100 such that cleaning the camera(s) 210, 212, 310, 410, 510 using the cleaning system(s) 320, 420, 520 may be desirable. If the controller 602 determines in block 916 that the runtime duration of the tool 118 exceeds the reference duration, the method 800 subsequently proceeds to block 930.

In block 918 of the illustrative method 800, based on the input (or lack thereof) provided by the user via the dashboard 652 in block 804, the controller 602 determines whether activation (e.g., powering on to enable image capture) of the camera(s) 210, 212, 310, 410, 510 is requested/directed. If the controller 602 determines in block 918 that activation of the camera(s) 210, 212, 310, 410, 510 is requested/directed, the method 800 subsequently proceeds to block 930.

In block 920 of the illustrative method 800, based on the camera input (or lack thereof) provided by the camera(s) 210, 212, 310, 410, 510 in block 808, the controller 602 determines whether the camera(s) 210, 212, 310, 410, 510 are inactive and/or whether one or more images are not displayed by the dashboard 652. If the controller 602 determines in block 920 that the camera(s) 210, 212, 310, 410, 510 are inactive and/or that one or more images are not displayed by the dashboard 652, the method 800 subsequently proceeds to block 930.

In block 922 of the illustrative method 800, based on the input (or lack thereof) provided by the main wiper sensor(s) 650 in block 806, the controller 602 determines whether the main wiper devices 136, 138 are activated. If the controller 602 determines in block 922 that the main wiper devices 136, 138 are activated, the method 800 subsequently proceeds to block 930.

In block 924 of the illustrative method 800, based on the input (or lack thereof) provided by the camera(s) 210, 212, 310, 410, 510 in block 808, the controller 602 measures the brightness of one or more images captured by the camera(s) 210, 212, 310, 410, 510 and determines whether the brightness of the one or more images is less than a reference brightness. In some embodiments, the reference brightness may be a brightness that corresponds to, or is otherwise associated with, an image having an acceptable level of quality, brightness, and/or resolution. If the controller 602 determines in block 924 that the brightness of the one or more images is less than the reference brightness, the method 800 subsequently proceeds to block 930.

In block 926 of the illustrative method 800, based on the input (or lack thereof) provided by the particle sensor(s) 126 in block 810, the controller 602 determines whether the amount of detected particles in the environment surrounding the work machine 100 exceeds a reference particle threshold. In some embodiments, the reference particle threshold may correspond to an accumulation of particles such that cleaning the camera(s) 210, 212, 310, 410, 510 using the cleaning system(s) 320, 420, 520 may be desirable. If the controller 602 determines in block 926 that the detected particles exceed the reference particle threshold, the method 800 subsequently proceeds to block 930.

In block 928 of the illustrative method 800, based on the input (or lack thereof) provided by the moisture sensor(s) 132 in block 812, the controller 602 determines whether the amount of detected moisture and/or humidity in the environment surrounding the work machine 100 exceeds a reference moisture threshold. In some embodiments, the reference moisture threshold may correspond to an accumulation of moisture and/or humidity such that cleaning the camera(s) 210, 212, 310, 410, 510 using the cleaning system(s) 320, 420, 520 may be desirable. If the controller 602 determines in block 928 that the detected moisture and/or humidity exceeds the reference moisture threshold, the method 800 subsequently proceeds to block 930.

In block 930 of the illustrative method 800, the controller 602 cleans, or otherwise directs cleaning of, the camera(s) 210, 212, 310, 410, 510 using the cleaning system(s) 320, 420, 520. In some embodiments, performance of block 930 may include, or otherwise be associated with, performance of blocks 932, 934, and 936. For ease of illustration, however, blocks 932, 934, 936 are depicted in FIG. 9 as being separate from the block 930. From block 930, the method 800 subsequently proceeds to block 932.

In block 932 of the illustrative method 800, the controller 602 delivers, or otherwise directs delivery of, cleaning fluid to the camera(s) 210, 212, 310, 410, 510 using one or more of the nozzle dispenser(s) 330, 430, 530. From block 932, the method 800 subsequently proceeds to block 934.

In block 934 of the illustrative method 800, the controller 602 actuates, or otherwise directs actuation of, one or more of the secondary wiper devices 324, 424, 524 via the secondary wiper actuators 642. From block 934, the method 800 subsequently proceeds to block 936.

In block 936 of the illustrative method 800, the controller 602 activates, or directs activation of, the one or more heating elements 534. In some embodiments, performance of block 936 may correspond to, or otherwise be associated with, performance of a single iteration of the method 800.

Returning to block 916 of the illustrative method 800, if the controller 602 determines in block 916 that the runtime duration of the tool 118 does not exceed the reference duration, the method 800 returns to block 814.

Returning to block 918 of the illustrative method 800, if the controller 602 determines in block 918 that activation of the camera(s) 210, 212, 310, 410, 510 is not requested/directed by the user, the method 800 returns to block 814.

Returning to block 920 of the illustrative method 800, if the controller 602 determines in block 920 that the camera(s) 210, 212, 310, 410, 510 are active and/or that one or more images are displayed by the dashboard 652, the method 800 returns to block 814.

Returning to block 922 of the illustrative method 800, if the controller 602 determines in block 922 that the main wiper devices 136, 138 are not activated, the method 800 returns to block 814.

Returning to block 924 of the illustrative method 800, if the controller 602 determines in block 924 that the brightness of the one or more images is not less than the reference brightness, the method 800 returns to block 814.

Returning to block 926 of the illustrative method 800, if the controller 602 determines in block 926 that the detected particles do not exceed the reference particle threshold, the method 800 returns to block 814.

Returning to block 928 of the illustrative method 800, if the controller 602 determines in block 928 that the detected moisture and/or humidity does not exceed the reference moisture threshold, the method 800 returns to block 814.

Referring now to FIG. 10, an illustrative method 1000 of operating the work machine 100 may be embodied as, or otherwise include, a set of instructions that are executable by the control system 600 (i.e., the cleaning system activation module 704 of the controller 602). The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, the controller 602 receives input from the camera(s) 210, 212, 310, 410, 510 indicative of one or more images captured by the camera(s) 210, 212, 310, 410, 510. In some embodiments, to perform block 1002, the controller 602 may perform block 1004. In such embodiments, in block 1004, the controller 602 receives input from the one or more shutter sensors 318, 418, 518 indicative of actuation (or non-actuation) of the shutter(s) associated with the camera(s) 210, 212, 310, 410, 510. In any case, following block 1002, the method 1000 subsequently proceeds to block 1006.

In block 1006 of the illustrative method 1000, based on the camera input received in block 1002, the controller 602 determines an activation state of the camera(s) 210, 212, 310, 410, 510. From block 1006, the method 1000 subsequently proceeds to block 1008.

In block 1008 of the illustrative method 1000, based on the input provided by the one or more shutter sensors 318, 418, 518 in block 1004, the controller 602 determines whether the shutter(s) associated with the camera(s) 210, 212, 310, 410, 510 are actuated. If the controller 602 determines in block 1008 that the shutter(s) associated with the camera(s) 210, 212, 310, 410, 510 are actuated, the method 1000 subsequently proceeds to block 1010.

In block 1010 of the illustrative method 1000, the controller 602 cleans, or otherwise directs cleaning of, the camera(s) 210, 212, 310, 410, 510 using the cleaning system(s) 320, 420, 520. In some embodiments, performance of block 1010 may include, or otherwise be associated with, performance of blocks 1012, 1014, and 1016. For ease of illustration, however, blocks 1012, 1014, 1016 are depicted in FIG. 10 as being separate from the block 1010. From block 1010, the method 1000 subsequently proceeds to block 1012.

In block 1012 of the illustrative method 1000, the controller 602 delivers, or otherwise directs delivery of, cleaning fluid to the camera(s) 210, 212, 310, 410, 510 using one or more of the nozzle dispenser(s) 330, 430, 530. From block 1012, the method 1000 subsequently proceeds to block 1014.

In block 1014 of the illustrative method 1000, the controller 602 actuates, or otherwise directs actuation of, one or more of the secondary wiper devices 324, 424, 524 via the secondary wiper actuators 642. From block 1014, the method 1000 subsequently proceeds to block 1016.

In block 1016 of the illustrative method 1000, the controller 602 activates, or directs activation of, the one or more heating elements 534. In some embodiments, performance of block 1016 may correspond to, or otherwise be associated with, performance of a single iteration of the method 1000.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A work machine comprising:
 a frame structure;
 a work implement coupled to the frame structure that includes at least one ground engagement tool configured for interaction with an underlying surface in use of the work machine;
 a camera coupled to the frame structure that is configured to provide camera input indicative of one or more images captured by the camera in use of the work machine;
 a cleaning system coupled to the frame structure that is configured to clean the camera in use of the work machine; and
 a control system coupled to the frame structure that includes a controller communicatively coupled to the camera and to the cleaning system, wherein the controller includes memory having instructions stored therein that are executable by a processor to cause the processor to receive the camera input from the camera and to clean the camera by the cleaning system based at least partially on the camera input.

2. The work machine of claim 1, further comprising:
 an operator cab coupled to the frame structure that defines an interior compartment sized to accommodate an operator in use of the work machine; and a main wiper device coupled to the operator cab that is configured to clean an exterior surface of the operator cab in use of the work machine, wherein the control system includes a main wiper sensor that is communicatively coupled to the controller and configured to provide wiper input indicative of an operational state of the main wiper device, and wherein the instructions stored in the memory are executable by the processor to cause the processor to receive the wiper input from the main wiper sensor, to determine whether the main wiper device is activated based on the wiper input, and to clean the camera by the cleaning system at least partially in response to a determination that the main wiper device is activated.

3. The work machine of claim 2, wherein:

the control system includes a work implement sensor that is communicatively coupled to the controller and configured to provide work implement input indicative of an operational state of the ground engagement tool in use of the work machine; and the instructions stored in the memory are executable by the processor to cause the processor to receive the work implement input from the work implement sensor, to determine whether a runtime duration of the ground engagement tool is greater than a reference duration based on the work implement input, and to clean the camera by the cleaning system at least partially in response to a determination that the runtime duration of the ground engagement tool is greater than the reference duration.

4. The work machine of claim 3, wherein the instructions stored in the memory are executable by the processor to cause the processor to measure the brightness of the one or more images associated with the camera input, to determine whether the brightness of the one or more images is less than a reference brightness based on the camera input, and to clean the camera by the cleaning system at least partially in response to a determination that the brightness of the one or more images is less than the reference brightness.

5. The work machine of claim 4, wherein the instructions stored in the memory are executable by the processor to cause the processor to determine based on the camera input whether the camera is inactive and/or or whether the one or more images are not displayed by a dashboard of the control system, and to clean the camera by the cleaning system at least partially in response to a determination that the camera is inactive or that the one or more images are not displayed by the dashboard.

6. The work machine of claim 5, wherein the work machine is an excavator and the ground engagement tool is a hydraulic hammer configured to break up the underlying surface in use of the work machine.

7. The work machine of claim 1, wherein:

the camera input includes shutter input provided by a shutter sensor of the camera that is indicative of actuation of a shutter of the camera in use of the work machine; and the instructions stored in the memory are executable by the processor to cause the processor to determine an operational state of the camera based on the shutter input and to clean the camera by the cleaning system at least partially in response to a determination that the shutter is actuated.

8. The work machine of claim 7, wherein the work machine is an excavator and the ground engagement tool is a hydraulic hammer configured to break up the underlying surface in use of the work machine.

* * * * *